(12) United States Patent
Tran et al.

(10) Patent No.: US 10,418,068 B2
(45) Date of Patent: Sep. 17, 2019

(54) VISUAL DATA RECORDING SYNCHRONIZATION SYSTEM

(71) Applicants: David Dat Tran, Allen, TX (US); David Allen Collmann, Austin, TX (US)

(72) Inventors: David Dat Tran, Allen, TX (US); David Allen Collmann, Austin, TX (US)

(*) Notice: Subject to any disclaimer, the term of this patent is extended or adjusted under 35 U.S.C. 154(b) by 17 days.

(21) Appl. No.: 15/487,398

(22) Filed: Apr. 13, 2017

(65) Prior Publication Data

US 2017/0301373 A1  Oct. 19, 2017

Related U.S. Application Data

(60) Provisional application No. 62/321,907, filed on Apr. 13, 2016.

(51) Int. Cl.
| | |
|---|---|
| G11B 27/34 | (2006.01) |
| G06F 16/27 | (2019.01) |
| G06F 16/29 | (2019.01) |
| G06F 16/58 | (2019.01) |
| B64C 39/02 | (2006.01) |
| B64D 47/08 | (2006.01) |
| G01S 19/13 | (2010.01) |

(Continued)

(52) U.S. Cl.
CPC ............ *G11B 27/34* (2013.01); *B64C 39/024* (2013.01); *B64D 47/08* (2013.01); *G01S 19/13* (2013.01); *G01S 19/14* (2013.01); *G01S 19/39* (2013.01); *G06F 16/27* (2019.01); *G06F 16/29* (2019.01); *G06F 16/5866* (2019.01); *G11B 27/3036* (2013.01); *H04N 5/77* (2013.01); *H04N 5/91* (2013.01); *H04N 5/9201* (2013.01); *H04N 9/8205* (2013.01); *H04N 9/8715* (2013.01); *B64C 2201/127* (2013.01)

(58) Field of Classification Search
None
See application file for complete search history.

(56) References Cited

U.S. PATENT DOCUMENTS

| | | | |
|---|---|---|---|
| 6,903,763 B1 * | 6/2005 | Noguchi | G01C 21/36 348/116 |
| 9,415,869 B1 * | 8/2016 | Chan | B64C 39/024 |

(Continued)

*Primary Examiner* — Heather R Jones
(74) *Attorney, Agent, or Firm* — John D. Tran; Rhema Law Group

(57) ABSTRACT

A positional recording synchronization system can include: creating a time stamped telemetry point for an unmanned aerial vehicle; creating a time stamped recording; creating transformed data from the time stamped recording, the transformed data being tiles for zooming or thumbnails; creating a flightpath array, an image metadata array, and a video metadata array; determining whether entries of the video metadata array match with the flightpath array; determining whether entries of the image metadata array match with the flightpath array; synchronizing the time stamped telemetry point with the time stamped recording based on either the entries of the image metadata array matching the flightpath array, the entries of the visualizer module matching the flightpath array, or a combination thereof; and displaying the time stamped telemetry point as a selection tool for calling, viewing, or manipulating the time stamped recording on a display.

23 Claims, 6 Drawing Sheets

(51) Int. Cl.
*H04N 5/92* (2006.01)
*H04N 9/87* (2006.01)
*H04N 5/77* (2006.01)
*H04N 5/91* (2006.01)
*H04N 9/82* (2006.01)
*G11B 27/30* (2006.01)
*G01S 19/14* (2010.01)
*G01S 19/39* (2010.01)

(56) References Cited

U.S. PATENT DOCUMENTS

| | | | |
|---|---|---|---|
| 2002/0001032 A1* | 1/2002 | Ohki | G01S 19/14 |
| | | | 348/207.99 |
| 2015/0268058 A1* | 9/2015 | Samarasekera | G06K 9/00637 |
| | | | 701/409 |
| 2017/0001721 A1* | 1/2017 | Saika | B64C 27/48 |

* cited by examiner

VISUAL DATA RECORDING SYNCHRONIZATION SYSTEM

CROSS-REFERENCE TO RELATED APPLICATIONS

This claims priority benefit to all common subject matter of U.S. Provisional Patent Application No. 62/321,907 filed Apr. 13, 2016. The content of this application is incorporated herein by reference in its entirety.

TECHNICAL FIELD

This disclosure relates to synchronization between a position and recorded data, more particularly to unmanned aerial vehicle based data including pictures, videos, and other measurements synchronized to a set of telemetry points.

BACKGROUND

The commercial, military, and civilian unmanned aerial vehicle industry, commonly referred to as unmanned aerial vehicles, is an emerging industry in the United States estimated to be $7 to $10 billions of dollars by 2020. The commercial unmanned aerial vehicle market is expected to be between $2 to $3 Billion by 2020.

Commercial unmanned aerial vehicles have many potential applications especially in the areas of data collection, thus driving rapid innovation and variety of unmanned aerial vehicle hardware and software products. However, as unmanned aerial vehicle applications become mainstream businesses and consumers are seeking better ways to manage the increasingly diverse set of applications and the associated data collected by these unmanned aerial vehicles.

In particular, with the growing sophistication and potential applications for unmanned aerial vehicles there exist increase complexities of organizing and managing vast array of data collected by unmanned aerial vehicles such as video, pictures, and other measurements. Generally, the methods of managing unmanned aerial vehicle workflow are targeted at control and operations.

These can include fleet management, unmanned aerial vehicle flight path management, and data storage management. However, the existing repository for unmanned aerial vehicle generated results are rudimentary and generally lack automation correlating data sets with spatial information including time and positioning.

A current problem with the unmanned aerial vehicle manufacturers and third party software platforms is that they provide platforms for managing the unmanned aerial vehicle hardware, flight plans, and possible raw storage of the unmanned aerial vehicle data; however, currently there is limited ability to efficiently address unique workflow of correlating the unmanned aerial vehicle flight path data with the unmanned aerial vehicle data recordings to provide efficient data analytics and intuitive use. This results in fragmented and manual work for the end user to manage and process both the unmanned aerial vehicle flight data and the unmanned aerial vehicle data recordings.

The lack of standardized workflow data automation by existing vendors limits the potential effectiveness of the unmanned aerial vehicles. The workflow requires multiple manual steps relying on a user's intuition in order to visualize, extract, and correlate this data rather than on a set of concrete rules and procedures.

In addition, the process that an end user must employ is unique to each different type, class, or brand of unmanned aerial vehicle. Today no single automated workflow exists for users to visually synchronize the data collected by the unmanned aerial vehicle along with the unmanned aerial vehicle flight path data.

Solutions have been long sought but prior developments have not taught or suggested any complete solutions, and solutions to these problems have long eluded those skilled in the art. Thus, there remains a considerable need for a system that can efficiently and effectively synchronize flight path data with recorded data.

SUMMARY

A synchronization system providing significantly more efficient and effective synchronization of flight path data with recorded data, is disclosed. The synchronization system can include: creating a time stamped telemetry point for an unmanned aerial vehicle from a locational timer and a GPS unit; creating a time stamped recording from a recording sensor including an audiovisual sensor and a recording timer, the time stamped recording including metadata; creating transformed data from the time stamped recording, the transformed data being tiles for zooming or thumbnails; creating a flightpath array, an image metadata array, and a video metadata array; determining whether entries of the video metadata array match with the flightpath array; determining whether entries of the image metadata array match with the flightpath array; synchronizing the time stamped telemetry point with the time stamped recording based on either the entries of the image metadata array matching the flightpath array, the entries of the visualizer module matching the flightpath array, or a combination thereof; and displaying the time stamped telemetry point as a selection tool for calling, viewing, or manipulating the time stamped recording on a display.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The synchronization system is illustrated in the figures of the accompanying drawings which are meant to be exemplary and not limiting, in which like reference numerals are intended to refer to like components, and in which.

DETAILED DESCRIPTION

Figure 1:
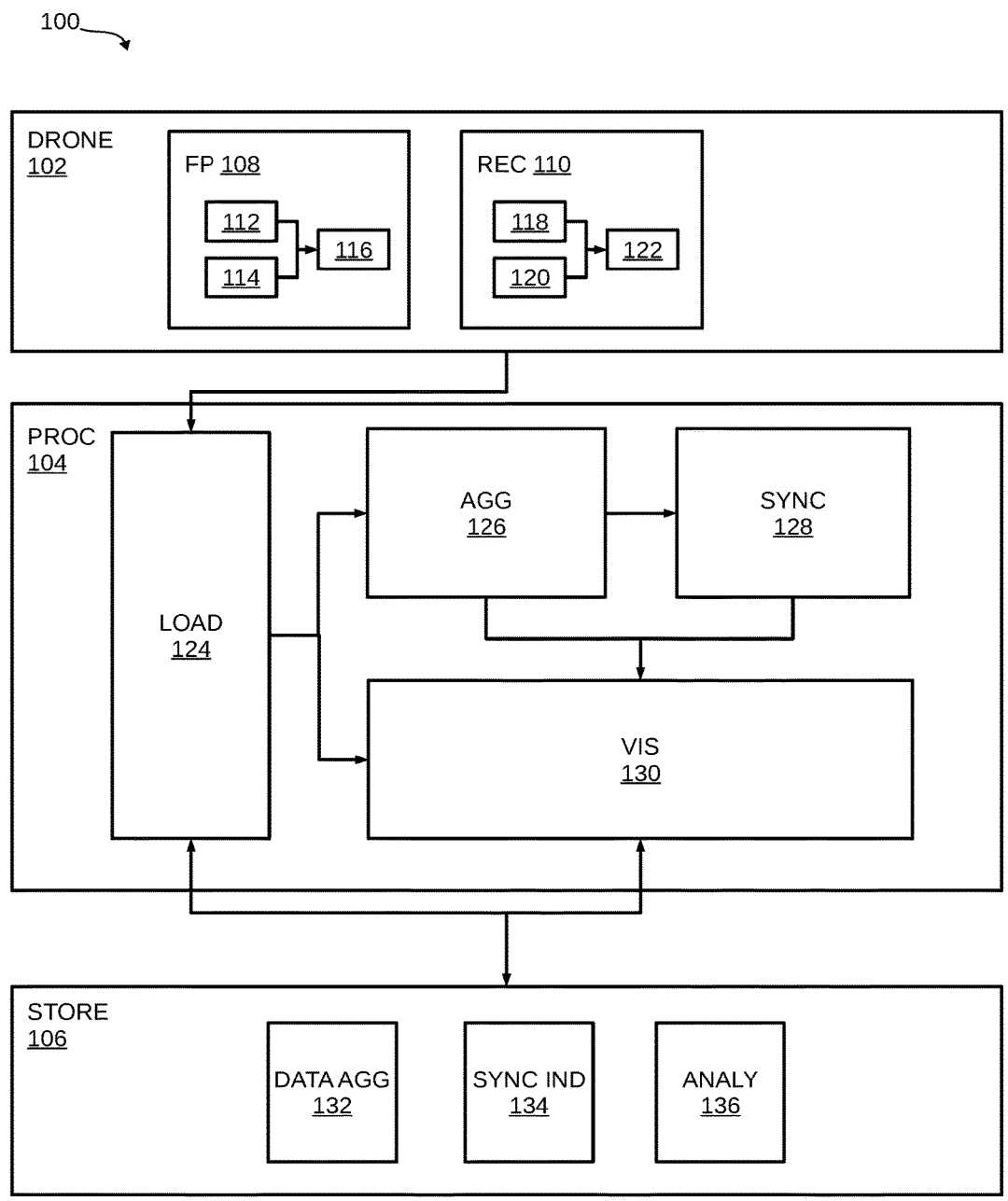
FIG. 1 is a block diagram of the synchronization system.

In the following description, reference is made to the accompanying drawings that form a part hereof, and in which are shown by way of illustration, embodiments in which the synchronization system may be practiced. It is to be understood that other embodiments may be utilized and structural changes may be made without departing from the scope of the synchronization system.

When features, aspects, or embodiments of the synchronization system are described in terms of steps of a process, a micro-service providing process, an operation, a control flow, or a flow chart, it is to be understood that the steps can be combined, performed in a different order, deleted, or include additional steps without departing from the synchronization system as described herein.

The synchronization system is described in sufficient detail to enable those skilled in the art to make and use the synchronization system and provide numerous specific details to give a thorough understanding of the synchronization system; however, it will be apparent that the synchronization system may be practiced without these specific details. As used herein the term "system" can mean a process or apparatus depending on the context in which the term is used.

In order to avoid obscuring the synchronization system, some well-known system configurations, steps, rules, or algorithms are not disclosed in detail. Likewise, the drawings showing embodiments of the system are semi-diagrammatic and not to scale and, particularly, some of the dimensions are for the clarity of presentation and are shown greatly exaggerated in the drawing FIGS.

Referring now to FIG. 1, therein is shown a block diagram of the synchronization system 100. The synchronization system 100 is depicted including an unmanned aerial vehicle 102, coupled to processors 104, and coupled to storage 106.

The processors 104 can be a processor on a single device, such as an end user's computer or mobile device. It is further contemplated that the processors 104 can be a distributed computational system such as multiple connected devices over a network.

Similarly, the storage 106 is contemplated to be storage on a single device or storage distributed on multiple devices. As used herein, the storage 106 is a non-transitory computer readable medium in useful association with one or more of the processors 104.

The unmanned aerial vehicle 102 is shown to have multiple components including flight path sensors 108 and data recording sensors 110. The flight path sensors 108 can include a GPS unit 112 and a locational timer 114. It is contemplated that the GPS unit 112 could include or be combined with the locational timer 114 into a single unitary sensor.

The GPS unit 112 and the locational timer 114 can produce time-stamped telemetry points 116 such as (x, y, z, t) telemetry points along the flightpath of the unmanned aerial vehicle 102. The unmanned aerial vehicle 102 can further include the data recording sensors 110 for recording audio and visual data.

Illustratively, the unmanned aerial vehicle 102 can include audiovisual sensors 118 such as a still camera, a video camera, and a microphone. The data recording sensors 110 can further include a recording timer 120. It alternatively contemplated that the audiovisual sensor can include GPS stamped information transmitted by the GPS Unit 112 or from the audiovisual sensor itself.

The recording timer 120 can be a timer directly coupled or within the audiovisual sensors 118 and can be independent of the locational timer 114. It is alternatively contemplated that the flight path sensors 108 and the data recording sensors 110 can utilize the same timer.

The unmanned aerial vehicle 102 can combine the data generated from the audiovisual sensors 118 and the recording timer 120 to produce time stamped recordings 122. The time stamped recordings 122 can include still images taken at a specified time or video frames taken at specified times. The time stamped recordings 122 can further include audio recordings recorded at specified times. In addition the time stamped records 122 can further include GPS metadata.

The time stamped recordings 122 and the time stamped telemetry points 116 can be transmitted from the unmanned aerial vehicle 102 to a loading module 124 running on the processors 104. The processors 104 can be configured to run and perform all the steps, algorithms, and calculations required by the loader module 124.

It is contemplated that the unmanned aerial vehicle 102 can store the time stamped telemetry points 116 along with the time stamped recordings 122 within memory on the unmanned aerial vehicle 102. It is further contemplated that the time stamped telemetry points 116 and the time stamped recordings 122 can sent to the loader module 124 in real time or can be stored on the unmanned aerial vehicle 102 and later transmitted to the loader module 124.

It is contemplated that the time stamped recordings 122 and the time stamped telemetry points 116 can be sent to the loader module 124 using a wireless connection, a wired connection, or a combination thereof. It is alternatively contemplated that the unmanned aerial vehicle 102 can collect other types of information including telemetry data such as light conditions, temperatures, pressures, and humidities, all of which can be time stamped and sent to the loader module 124 along with the time stamped telemetry points 116 and the time stamped recordings 122.

The processors 104 can further be configured to run and perform all steps, algorithms, and calculations of an aggregation module 126, a synchronizer module 128, and a visualizer module 130. As discussed below with regard to FIG. 4, the loader module 124 can provide information and data to the aggregation module 126 and the visualizer module 130.

The aggregation module 126 and the synchronizer module 128 can provide information and data to the visualizer module 130. The visualizer module 130 and the loader module 124 can send and receive information from the storage 106.

The aggregation module 126 can compile the time stamped recordings 122 from the loader module 124. The aggregation module 126 can further decode the flightpath and geo-spatial data from the unmanned aerial vehicle 102 including the time stamped telemetry points 116.

The synchronizer module 128 can receive an output from the aggregation module 126 and can correlate and automatically map data elements from the aggregation module 126 and assign unique index ID to the data elements from the aggregation module 126 for later data retrieval and tagging by the visualizer module 130.

The visualizer module 130 can be a real-time graphical visual interface allowing users to visualize the flightpath of the unmanned aerial vehicle 102 alongside the time stamped recordings 122. The visualizer module 130 can further allow a user to select and view the time stamped recordings 122 by selecting specific time stamped telemetry points 116. In addition it is contemplated that the visualizer module 130 can further allow users to view GPS geo-location stamped audiovisual data alongside the flightpath. The visualizer module 130 can further allow users to view and manipulate the data collected by the unmanned aerial vehicle along the event path.

The data and information from the loader module 124 and the visualizer module 130 can be input into databases within the storage 106. The storage 106 can include a data aggregation database 132, a synch and index database 134, and an analytics database 136.

The data aggregation database 132 can be implemented to store the time stamped telemetry points 116 and the time stamped recordings 122. The synch and index database 134 can store correlated data indexed within the visualizer module 130. The analytics database 136 can store user defined selections and inputs from the visualizer module 130.

It is contemplated that the storage 106 can include instructions configured to run and perform all steps, algorithms, and calculations of the unmanned aerial vehicle 102, the loader module 124, the aggregation module 126, the synchronizer module 128, and the visualizer module 130.

Figure 2:
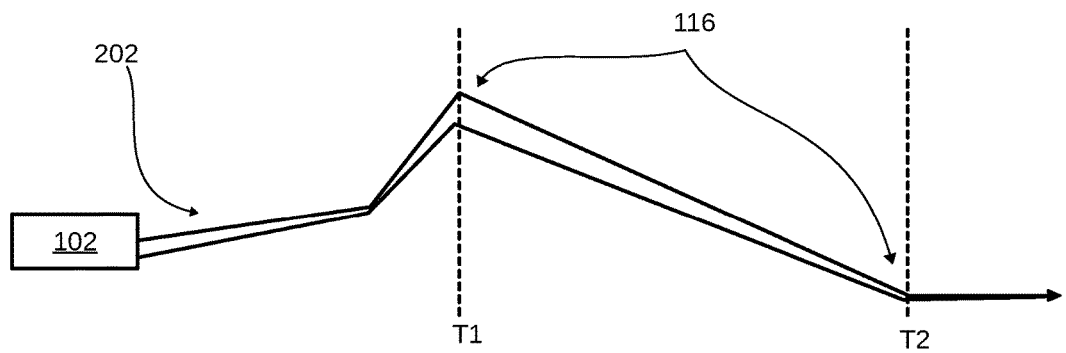
FIG. 2 is a graphical depiction of a flight path for the synchronization system.

Referring now to FIG. 2, therein is shown a graphical depiction of a flightpath 202 for the synchronization system 100. The flightpath 202, for the purposes of this application means a telemetry point 116 or a set of telemetry points 116, and is depicted as the flightpath 202 for the unmanned aerial vehicle 102.

The flight path 202 can include the time stamped telemetry points 116. As shown, the time stamped telemetry points 116 can be a location of the unmanned aerial vehicle 104 along with the time the unmanned aerial vehicle 104 was located at the telemetry point.

For example, the time stamped telemetry points 116 may include a lateral, vertical, depth, and time measurement and can be understood as an x, y, z, t coordinate. As is illustratively depicted a first telemetry point at T1 can be the x, y, z position of the unmanned aerial vehicle 102 at T1 while a second telemetry point at T2 can be the x, y, z position of the unmanned aerial vehicle 102 at T2. The telemetry points at T1 and T2 are depicted having different x, y, z coordinates which can result from the unmanned aerial vehicle 104 moving during the interval between T1 and T2.

It is contemplated that the time stamps T1 and T2 can be the time stamps from the locational timer 114 of FIG. 1. That is, T1 and T2 can be time stamps for time stamped telemetry points 116 rather than being generated by the recording timer 120 of FIG. 1 for the time stamped recordings 122 of FIG. 1.

Figure 3:
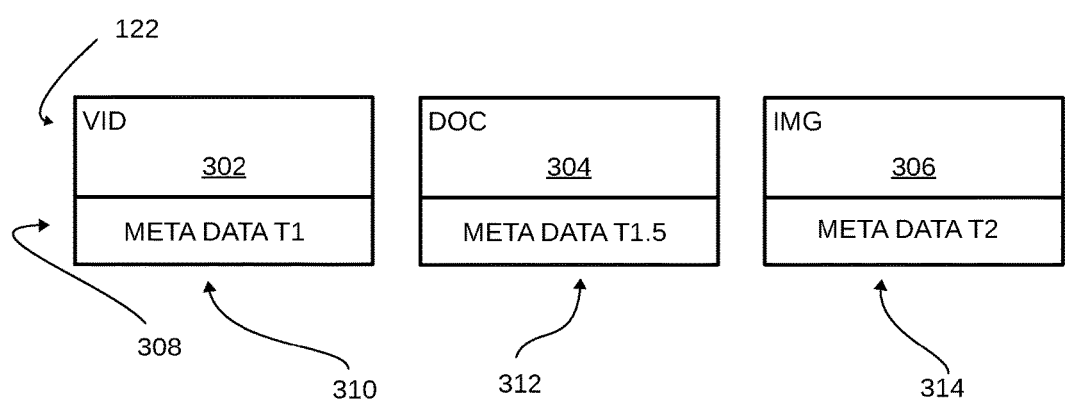
FIG. 3 is a graphical depiction of time stamped recordings for the synchronization system.

Referring now to FIG. 3, therein is shown a graphical depiction of time stamped recordings 122 for the synchronization system 100. As an illustrative example, the time stamped recordings 122 are depicted as video recordings 302, geo-tagged documents 304, and image recordings 306. Each of the time stamped recordings 122 is shown having associated metadata 308.

Specifically, the video recordings 302 are shown to have video meta-data 310, the geo-tagged documents 304 are shown having document meta-data 312, and the image recordings 306 are shown having image meta-data 314. The metadata 308 can include a geolocation tag and a time stamp for the time stamped recording 122.

The timestamps of the metadata 308 can be time stamps from the recording timer 120 of FIG. 1. As will be appreciated the timestamps from the recording timer 120 and the locational timer 114 of FIG. 1 may be similar or may be different and may also require a timer offset for proper synchronization.

Figure 4:
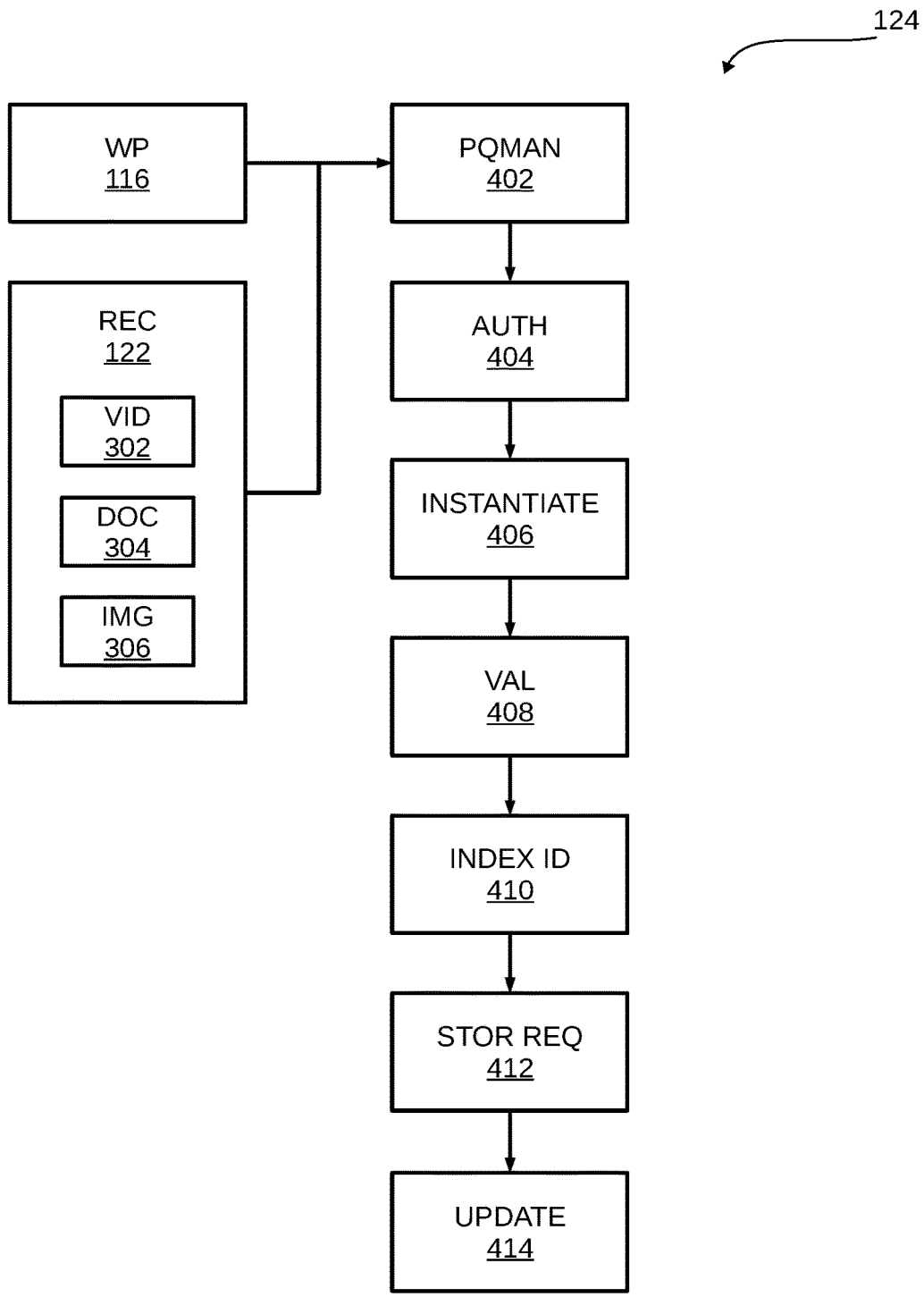
FIG. 4 is a control flow for the loader module of FIG. 1.

Referring now to FIG. 4, therein is shown a control flow for the loader module 124 of FIG. 1. The loader module 124 can retrieve and process multiple sources of information from the unmanned aerial vehicle 102 of FIG. 1 for use in the aggregation module 126 of FIG. 1 and the synchronizer module 128 of FIG. 1. It is contemplated that the loader module 124 can provide resource scaling and batch processing controls to allow large volumes of data and simultaneous user content upload requests.

The synchronization system 100 of FIG. 1 can begin the loader module 124 by initiating a parallel queue manager step 402. The parallel queue manager step 402 can collect information and data regarding the flightpath 202 of FIG. 2 of the unmanned aerial vehicle 102 including the time stamped telemetry point 116. The parallel queue manager step 402 can further collect the time stamped recording 122 from the unmanned aerial vehicle 102 including the video recording 302, the geo-tagged documents 304, and the image recording 306.

The parallel queue manager step 402 can process data upload requests from the unmanned aerial vehicle 102 and from other sources including users. The parallel queue manager step 402 can manage the upload requests machine-to-machine or machine to user, which can utilize HTTPS, FTP, API, or other interface protocols.

The synchronization system 100 can next initiate an authentication step 404. The authentication step 404 can authenticate the user of the system and can provide an authentication token for the user.

The synchronization system 100 can next initiate an instantiate storage request step 406. The instantiate storage request step 406 can begin the process of storing the time stamped telemetry point 116 and the time stamped recording 122.

The synchronization system 100 can next initiate a validate data format step 408. The validate data format step 408 can scrub the incoming data, including the time stamped telemetry point 116 and time stamped recording 122, to ensure conformance to supported data file formats as well as completeness of the data.

The synchronization system 100 can next initiate a generate ID step 410. The generate ID step 410 can generate a unique ID and database entry for the time stamped telemetry points 116 and the time stamped recordings 122.

The synchronization system 100 can next initiate a storage request step 412. The storage request step 412 can send a storage request to the storage 106 of FIG. 1 for storing the time stamped telemetry points 116 and the time stamped recordings 122.

The synchronization system 100 can next initiate an update database step 414. The update database step 414 can finalize the unique ID and database entry for the time stamped telemetry points 116 and the time stamped recordings 122. The update database step 414 can then update the storage 106 content.

It is contemplated that the instantiate storage request step 406, the validate data format step 408, the generate ID step 410, the storage request step 412, and the update database step 414 can operate as an internal sub-component of the loader module 124 that can perform database and file system processing to ensure content is properly stored and cataloged for the aggregation module 126.

Figure 5:
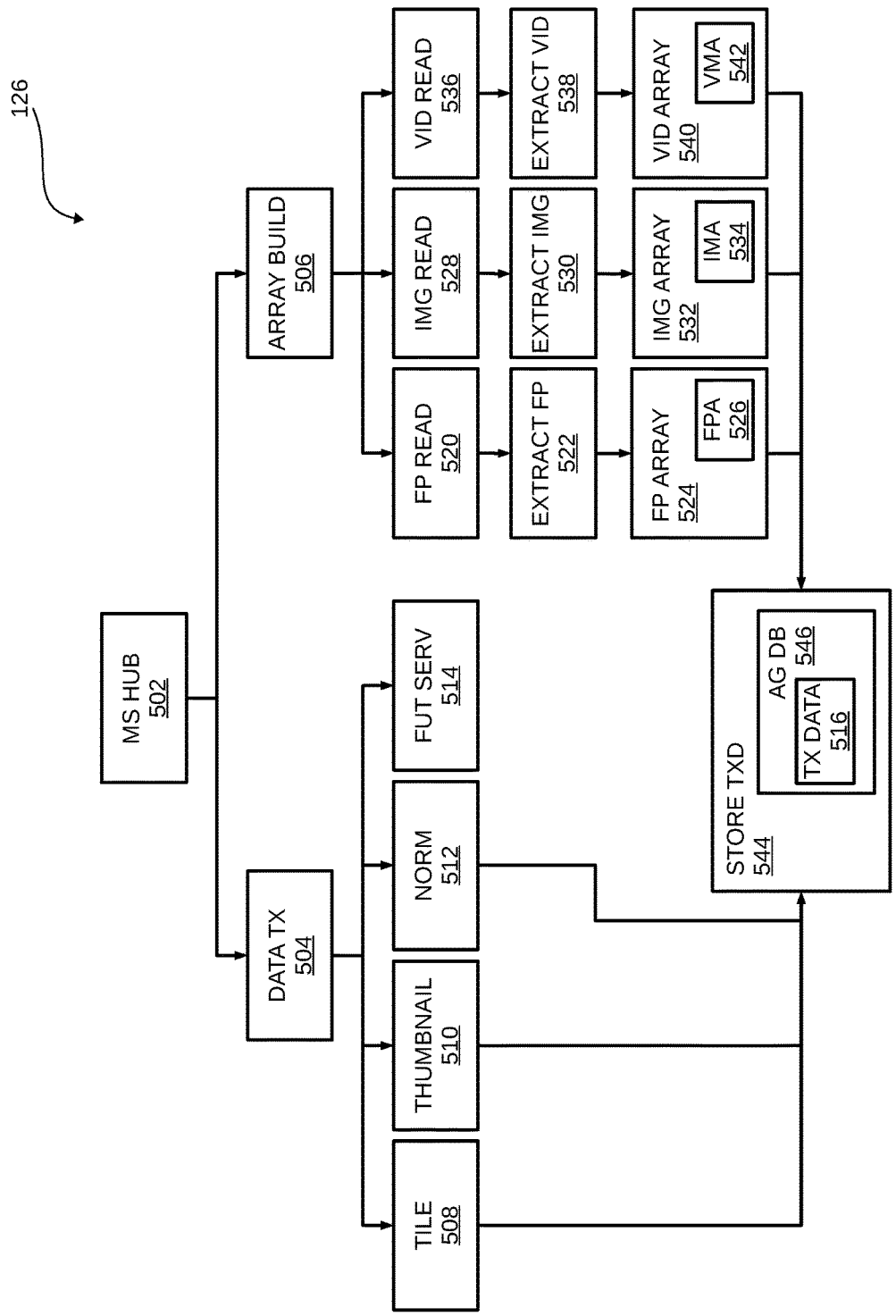
FIG. 5 is a control flow for the aggregation module of FIG. 1.

Referring now to FIG. 5, therein is shown a control flow for the aggregation module 126 of FIG. 1. The aggregation module 126 can be configured as a set of micro-services. It is contemplated the micro-services can be processes or sets of steps that communicate utilizing a network; however, it is further contemplated that the services might also use other kinds of inter-process communication mechanisms such as shared memory.

The aggregation module 126 can aggregate data processed by loader module 124 of FIG. 1 into a standardized format that can be utilized by the synchronizer module 128 of FIG. 1. The aggregation module 126 can include an initial micro-services hub 502.

The micro-services hub 502 can provide a hub for the two main purposes of the aggregation module 126 including compiling contents in a data transformation service 504 and decoding the unmanned aerial vehicle 102 of FIG. 1 flightpath 202 of FIG. 2 and other geo-spatial data in an array builder service 506.

The result of the data transformation service 504 can be to convert or transform disparate data content into a set of specific standardized file formats for further processing.

In performing the data transformation service 504, the synchronization system 100 of FIG. 1 can initiate a tile generator step 508, a thumbnail generator step 510, a normalization step 512, and provide a future service 514.

It is contemplated that the data transformation service 504 can initiate the tile generator step 508, the thumbnail generator step 510, the normalization step 512, and the future service 514 in parallel. Alternatively, it is contemplated that these steps could be performed in series.

The tile generator step 508 can provide deep zoom tiles for viewing the time stamped recording 122. That is, the visual data can be classified, grouped, or broken into unique tiles of images at multiple decreasing fields of view and increasing resolutions. The tile generator step 508 can reduce the time required for an initial load of the visualizer module 130 of FIG. 1 by allowing the visualizer module 130 to download only the tiles being viewed and only at the resolution it is displayed at.

The thumbnail generator step 510 can produce a thumbnail of the time stamped recording 122. That is, the thumbnail generator step 510 can provide a reduced-size versions of the video recording 302 of FIG. 3, the image recording 306 of FIG. 3, or the geo-tagged documents 304 of FIG. 3.

The normalization step 512 can ensure the formats of the time stamped recording 122 is a format compatible with the synchronization system 100. It is contemplated that the normalization step 512 can re-format the time stamped recording 122 to a single format or can re-format only data formats that are incompatible with multiple compatible formats used by the synchronization system 100.

The future service 514 demonstrates the versatility of the micro-services structure of the aggregation module 126 by enabling the aggregation module 126 to be built out further and without compromising or changing the tile generator step 508, the thumbnail generator step 510, and the normalization step 512.

The tile generator step 508, the thumbnail generator step 510, and the normalization step 512 can output transformed data 516. It is contemplated that the transformed data 516 can include the deep zoom tiles from the tile generator step 508, the thumbnails from the thumbnail generator step 510, and the reformatted and normalized files from the normalization step 512. It is further contemplated that the future service 514 can also output the transformed data 516.

Turning now to the array builder service 506, the result of the array builder service 506 can be to create data association references and indexes to provide proper storage and retrieval of the transformed data 516. The array builder service 506 can build arrays for the flightpath 202, the image recording 306, the video recording 302, or the geo-tagged documents 304 in parallel.

The array builder service 506 can initiate a flightpath data reader step 520. During the flightpath data reader step 520, the synchronization system 100 can read the data from the flightpath 202 including the time stamped telemetry points 116.

The array builder service 506 can next initiate an extract flightpath records step 522 in which the location provided by the GPS unit 112 of FIG. 1 and the time provided by the locational timer 114 of FIG. 1 are extracted. The array builder service 506 can next initiate a build flightpath array step 524.

The build flightpath array step 524 can produce a flightpath array 526 organizing the data of the time stamped telemetry points 116 in an array. The array builder service 506 can also initiate a read image header step 528.

During the read image header step 528 the synchronization system 100 can read and identify the image meta-data 314 of FIG. 3. The array builder service 506 can next initiate an extract image metadata step 530.

The extract image metadata step 530 can extract the image meta-data 314 of the image recordings 306. The array builder service 506 can next initiate a build image metadata array step 532.

The build image metadata array step 532 can organize the image meta-data 314 into an image metadata array 534. The array builder service 506 can also initiate a read video header step 536.

During the read video header step 536, the synchronization system 100 can read and identify the video meta-data 310 of FIG. 3. The array builder service 506 can next initiate an extract video metadata step 538.

The extract video metadata step 538 can extract the video meta-data 310 of the video recording 302. The array builder service 506 can next initiate a build video metadata array step 540. The build video metadata array step 540 can organize the video meta-data 310 of the video recording 302 into a video metadata array 542.

The data transformation service 504 and the array builder service 506 can then initiate a transformed data storage step 544. The transformed data storage step 544 can store the transformed data 516 of the data transformation service 504 into an aggregation database 546 based on the flightpath array 526, the image metadata array 534, and the video metadata array 542.

It has been discovered that utilizing the flightpath array 526, the image metadata array 534, and the video metadata array 542 enables the transformed data 516 to be stored and retrieved faster and more effectively during the visualizer module 130. For example, it is contemplated that the flightpath array 526 can contain a first column of times from the locational timer 114 of the unmanned aerial vehicle 102 and a second column of locations from the GPS unit 112 of the unmanned aerial vehicle 102.

The times and the locations from the unmanned aerial vehicle 102 can be correlated or matched based on the row the time and the location appear in. That is, each row in the flightpath array 526 can contain one of the times from the locational timer 114 and one of the locations from the GPS unit 112 and the time and the location within the row will correlate.

Further, the image metadata array 534 and the video metadata array 542 could include a time stamp from the recording timer 120 of FIG. 1. The time stamp from the recording timer 120 can be located in a column in each of the image metadata array 534 and the video metadata array 542. The transformed data 516 can be correlated, indexed, and stored by the time stamp of the original data from the time stamped recording 122, from which the transformed data 516 is based on.

The transformed data 516 can then be organized, correlated, indexed, or stored in tables having the time stamp from the recording timer 120 of the original time stamped recording 122 in one column and the transformed data 516 in other columns and in the same row as the time during which they were recorded.

That is, the transformed data 516 based on the time stamped recording 122 would be on the same row as the time stamp from the recording timer 120 of the time stamped recording 122. The time stamp associated with the transformed data 516 can then be associated with the flightpath array 526 to determine exactly what location the unmanned aerial vehicle 102 was in when the time stamped recording 122 was recorded, which would correspond to the transformed data 516.

It has been discovered that the data structures described herein provide non-abstract improvements to the speed and storage requirements of the underlying processors 104 of FIG. 1 and storage 106 of FIG. 1. Further, it has been discovered that the steps and rules described herein provide non-abstract improvements to the speed and storage requirements of the underlying processors 104 and storage 106.

Figure 6:
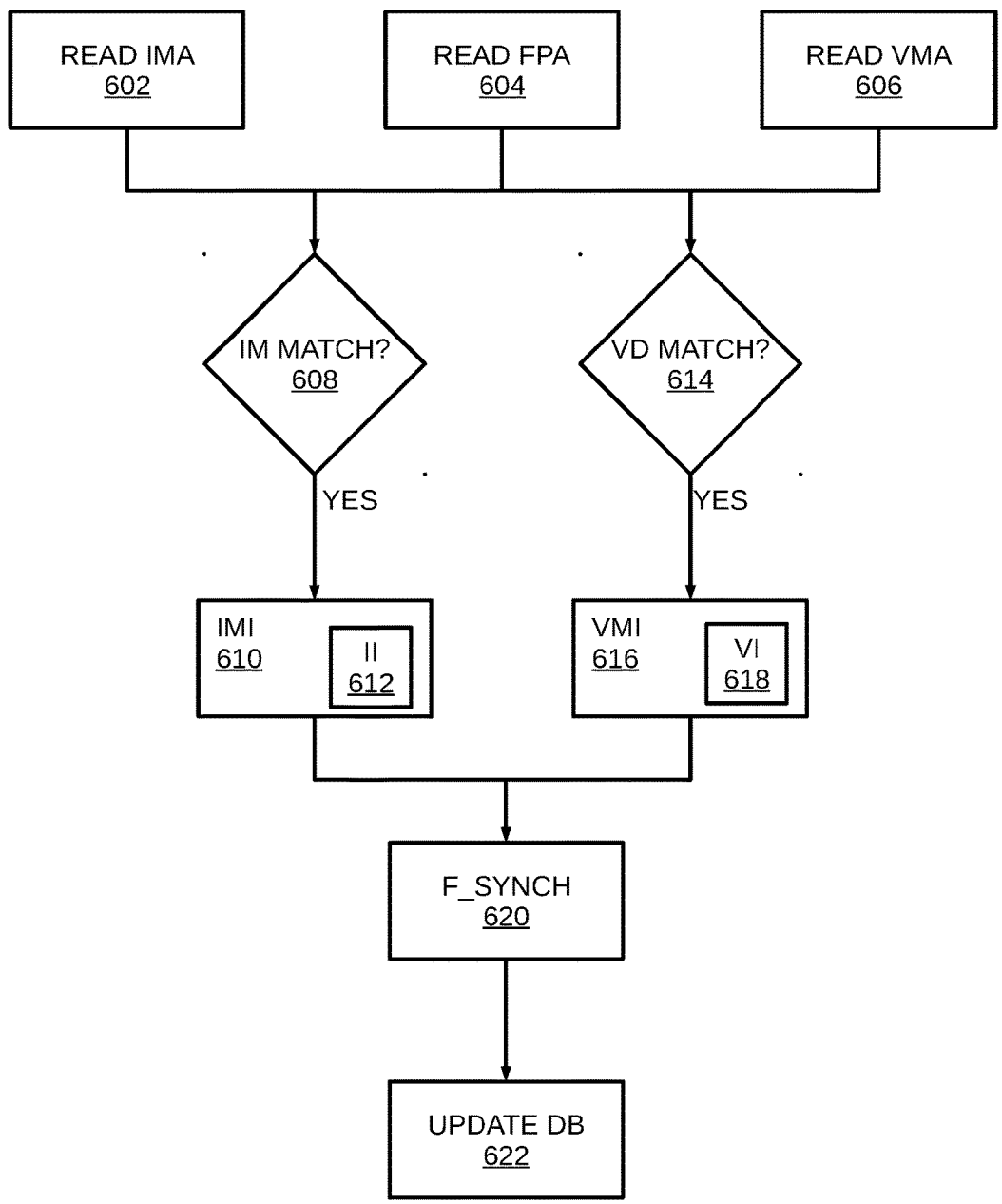
FIG. 6 is a control flow for the synchronizer module of FIG. 1.

Referring now to FIG. 6, therein is shown a control flow for the synchronizer module 128 of FIG. 1. The synchronizer module 128 can pull the transformed data 516 of FIG. 5 along with the flightpath array 526 of FIG. 5, the image metadata array 534 of FIG. 5, and the video metadata array 542 of FIG. 5 from the aggregation database 546 of FIG. 5.

As described below, the synchronizer module 128 can utilize a series of algorithms to analyze and correlate the image recording 306 of FIG. 3, the video recording 302 of FIG. 3 and the geo-tagged documents 304 of FIG. 3, with the time stamped telemetry points 116 of FIG. 1 of the unmanned aerial vehicle 102 of FIG. 1. The synchronizer module 128 can correlate the time stamped recording 122 with the time stamped telemetry points 116 and allow a user to specifically tag or otherwise manipulate the time stamped recording 122 or even the transformed data 516 provided by the data transformation service 504 of FIG. 5.

As previously discussed, the image metadata array 534 and the video metadata array 542 can correlate the time stamped recording 122 and the transformed data 516 with the flightpath array 526 and the time stamped telemetry points 116. The time stamped recording 122 and the transformed data 516 can be tagged or keyed to the time stamped telemetry points 116 or to rows within the flightpath array 526 with a unique Index ID for later data retrieval and tagging by the user.

The synchronizer module 128 can begin by initiating three steps in parallel. That is the synchronizer module 128 can initiate a read image metadata array step 602, a read flightpath metadata array step 604, and a read video metadata array step 606.

Beginning with the read image metadata array step 602, the synchronization system 100 of FIG. 1 can read the image metadata array 534 stored in a final completed form within the aggregation database 546. During the read image metadata array step 602, the synchronization system 100 can further pull any of the time and locations stamps included with the image meta-data 314 of FIG. 3. For example, the synchronizer module 128 can pull any presentation time stamps, program clock references or EXIF data, and GPS data.

During the read video metadata array step 606, the synchronization system 100 can read the video metadata array 542 stored in a final completed form within the aggregation database 546. During the read video metadata array step 606, the synchronization system 100 can further pull any of the time and locations stamps included with the video meta-data 310 of FIG. 3. For example, the synchronizer module 128 can pull any presentation time stamps, program clock references or EXIF data, and GPS data.

During the read flightpath metadata array step 604, the synchronization system 100 can read the flightpath array 526 stored in a final completed form within the aggregation database 546. The synchronizer module 128 can pull any GPS Time, Longitude, Latitude, and Altitude from the flightpath array 526 or the time stamped telemetry points 116.

It is contemplated that the synchronization system 100 can perform the read image metadata array step 602, the read flightpath metadata array step 604, and the read video metadata array step 606 and temporarily store the image metadata array 534, the video metadata array 542, and the flightpath array 526 in memory. Additionally, it is contemplated that some embodiments can read any additional data from the unmanned aerial vehicle 102 related to the time stamped telemetry points 116, and the time stamped recording 122.

The synchronizer module 128 can initiate an image match decision step 608 during which the synchronizer module 128 can determine which entries within the image metadata array 534 can be matched with the entries of the flightpath array 526. If entries of the image metadata array 534 can be matched with entries of the flightpath array 526, the synchronizer module 128 can initiate an image match index step 610.

During the image match index step 610, the synchronizer module 128 can create an image index 612 based on the time stamps within the image metadata array 534 and the flightpath array 526 matching. Alternatively, it is contemplated that the image index 612 can include entries from the image recording 306 that are timestamped within a window from the timestamp of the time stamped telemetry points 116.

The image index 612 can include a set of ID indexes that synchronize the time stamped recording 122 with the time stamped telemetry point 116. The synchronizer module 128 can further initiate a video match decision step 614 during which the synchronizer module 128 can determine which the synchronizer module 128 can determine which entries within the video metadata array 542 can be matched with the entries of the flightpath array 526.

If entries of the video metadata array 542 can be matched with the entries of the flightpath array 526, the synchronizer module 128 can initiate a video match index step 616. During the video match index step 616, the synchronizer module 128 can create a video index 618 based on the time stamps within the video metadata array 542 and the flightpath array 526 matching.

Alternatively, it is contemplated that the video index 618 can include entries from the video recording 302 that are timestamped within a window from the time stamp of the time stamped telemetry point 116.

The synchronizer module 128 can further initiate a F_Synch step 620. During the F_Synch step 620 the data sets of the image index 612 and the video index 618 can be matched using the eauation:

$$f\_Synch(x, y, z, t, f) = \int_0^t DroneLOG(t, x, y, z) \cap$$
$$DroneFP(t, x, y, z) \cap GPS(t, x, y, z) \cap Rec(t, F, m)$$

It is contemplated that x, y, and z can be the three dimensional location or coordinates. The t can be a GPS time stamp offset. The F can be a timing frame for video including presentation time stamps, or a program reference clock. The m can represent meta data including EXIF, and GPS of the time stamped recording 122 or other data. The unmanned aerial vehicleFP can be the flightpath 202 while the Rec can be the time stamped recording 122.

It has been discovered that synchronizing the image index 612 and the video index 618 to produce the unique matrix map can index the original time stamped recording 122 enabling non-abstract improvements to the speed of data retrieval and reduction of memory requirements of the storage 106.

Once the image index 612 and the video index 618 are correlated and indexed within the F_Synch step 620, the synchronizer module 128 can initiate an update database step 622 to store the index and the IDs.

Figure 7:
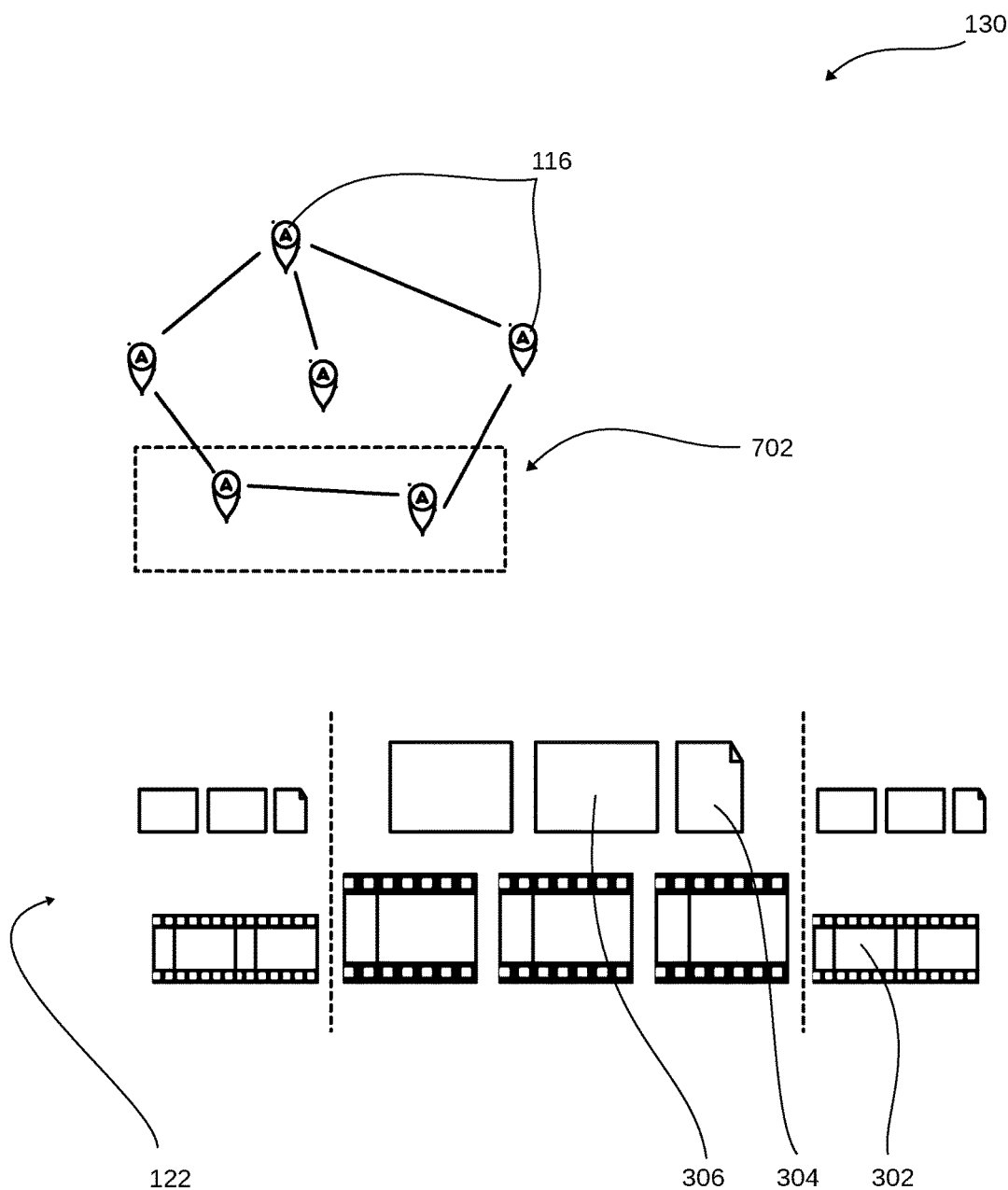
FIG. 7 is a graphical view of the visualizer module of FIG. 1.

Referring now to FIG. 7, therein is shown a graphical view of the visualizer module 130 of FIG. 1. The visualizer module 130 depicts the time stamped telemetry point 116, and the time stamped recording 122 and can display them in real time or can collect them and display them at a later time.

As will be appreciated, the synchronization system 100 of FIG. 1, through the visualizer module 130, can display visual depictions of physical objects in the form of the time stamped telemetry points 116 or the time stamped recording 122 on a user device. The time stamped recording 122 are shown including the video recording 302, the image recording 306, and the geo-tagged documents 304.

The time stamped recording 122 can be aligned below the depiction of the time stamped telemetry points 116. It is contemplated that the actual time stamped recording 122 can be represented by the transformed data 516 including thumbnails, deep zoom tiles, and even symbols such as video, image, or document symbols.

The visualizer module 130 is shown to further include user selected telemetry points 702. The user selected telemetry points 702 can be a single time stamped telemetry point 116 or can be multiple time stamped telemetry points 116.

When a user identifies the user selected telemetry points 702, the visualizer module 130 can emphasize the time stamped recording 122 that are correlated to the location of the user selected telemetry points 702. This can be seen as the video recording 302, the image recording 306, and the geo-tagged documents 304 that are enlarged below depiction of the time stamped telemetry points 116.

Enlarging the time stamped recording 122 that correlate with and are synchronized to the user selected telemetry points 702 enables the users to easily tag the time stamped recording 122, manipulate the time stamped recording 122, delete the time stamped recording 122, or manipulate the time stamped recording 122. It has been discovered that enabling users to save, inspect, and easily work with the time stamped telemetry points 116 and the time stamped recordings 122 once they have been processed and correlated by the loader module 124 of FIG. 1, the aggregation module 126 of FIG. 1, the synchronizer module 128 of FIG. 1 and the visualizer module 130 provides an enhanced user experience by providing an intuitive and fast ability to manipulate the time stamped recording 122.

The users then can simply save the time stamped recording 122 that have been correlated to the user selected telemetry points 702 on a server or export the results. It has been discovered that users are more likely to share and utilize the correlated data since it specifically highlights and references contents they are interested in from the time stamped recording 122 rather than the entire data set.

It is contemplated that an illustrative work flow could include a user selecting a project to visualize. The information for the project can be retrieved including the flightpath 202, the time stamped telemetry points 116, the time stamped recording 122, and the transformed data 516.

Thereafter the time stamped telemetry points 116 can be overlaid on a map with information relating the unmanned aerial vehicle's 102 flightpath 202 and other information collected by the unmanned aerial vehicle 102. The user may then select one or more time and GPS stamped telemetry points 116. The visualizer module 130 can then, in real time, retrieve and display the associated time stamped recording 122 and transformed data 516. Thereafter the user can manipulate the data by tagging, extracting, or editing.

Thus, it has been discovered that the synchronization system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the synchronization system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A method of positional recording synchronization comprising:
creating a time stamped telemetry point for an unmanned aerial vehicle from a locational timer and a GPS unit;
creating a time stamped recording from a recording sensor including an audiovisual sensor and a recording timer, the time stamped recording including metadata;
creating transformed data from the time stamped recording, the transformed data being tiles for zooming or thumbnails, the transformed data organized into a table having a recording time stamp of the time stamped recording in a first column, and the transformed data in a second column;
creating a flightpath array, an image metadata array, and a video metadata array, the transformed data being keyed, with a unique index IDs, to rows within the flightpath array;
retrieving the flightpath array, the image metadata array, and the video metadata array, each of which being in a final completed form, from an aggregation database;
determining whether entries of the video metadata array retrieved from the aggregation database match with the flightpath array retrieved from the aggregation database;
determining whether entries of the image metadata array retrieved from the aggregation database match with the flightpath array retrieved from the aggregation database;
synchronizing the time stamped telemetry point with the time stamped recording based on either the entries of the image metadata array matching the flightpath array, the entries of the visualizer module matching the flightpath array, or a combination thereof; and displaying the time stamped telemetry point as a selection tool for calling, viewing, or manipulating the time stamped recording on a display.

2. The method of claim 1 wherein creating the time stamped recording includes storing a video recording from a video camera, the video including multiple time stamps within video meta-data.

3. The method of claim 1 wherein creating the time stamped recording includes storing a still image recording from a camera.

4. The method of claim 1 further comprising storing the transformed data, the flightpath array, the video metadata array, and the image metadata array on an aggregation database.

5. The method of claim 1 further comprising:
detecting a user selected telemetry point; and
enlarging the time stamped recording synchronized with the user selected telemetry point.

6. The method of claim 1 further comprising:
creating an image ID index synchronizing the time stamped recording with the time stamped telemetry point;
creating a video ID index synchronizing the time stamped recording with the time stamped telemetry point; or
creating a combination thereof.

7. The method of claim 1 wherein displaying the time stamped telemetry point includes displaying the time stamped telemetry point overlaid onto a map.

8. The method of claim 1 wherein synchronizing the time stamped telemetry point with the time stamped recording includes synchronizing according to the following equation:

$$f\_Synch(x, y, z, t, f) = \int_0^t DroneLOG(t, x, y, z) \cap DroneFP(t, x, y, z) \cap GPS(t, x, y, z) \cap Rec(t, F, m)$$

where:
x, y, and z set forth three dimensional coordinates;
t sets forth a GPS time stamp offset;
F sets forth a timing frame for video;
m sets forth the meta data of the time stamped recording;
f_Synch sets forth a matrix map for the time stamped recording;
DroneLOG sets forth recordings from the unmanned arial vehicle including the three dimensional coordinates and the GPS time stamp offset;
DroneFP sets forth a flightpath of the unmanned aerial vehicle including the three dimensional coordinates and the GPS time stamp offset;
GPS sets forth recordings from the GPS unit including the three dimensional coordinates and the GPS time stamp offset; and
Rec sets forth the time stamped recording including the GPS time stamp offset, the timing frame, and the meta data.

9. A non-transitory computer readable medium in useful association with a processor including instructions configured to:
create a time stamped telemetry point for an unmanned aerial vehicle from a locational timer and a GPS unit;
create a time stamped recording from a recording sensor including an audiovisual sensor and a recording timer, the time stamped recording including metadata;
create transformed data from the time stamped recording, the transformed data being tiles for zooming or thumbnails, the transformed data organized into a table having a recording time stamp of the time stamped recording in a first column, and the transformed data in a second column;
create a flightpath array, an image metadata array, and a video metadata array, the transformed data being keyed, with unique index IDs, to rows within the flightpath array;
retrieving the flightpath array, the image metadata array, and the video metadata array, each of which being in a final completed form, from an aggregation database;
determine whether entries of the video metadata array retrieved from the aggregation database match with the flightpath array retrieved from the aggregation database;
determine whether entries of the image metadata array retrieved from the aggregation database match with the flightpath array retrieved from the aggregation database;
synchronize the time stamped telemetry point with the time stamped recording based on the entries of the image metadata array matching the flightpath array, the entries of the visualizer module matching the flightpath array, or a combination thereof; and
display the time stamped telemetry point as a selection tool for calling, viewing, or manipulating the time stamped recording on a display.

10. The computer readable medium of claim 9 wherein the instructions configured to create the time stamped recording includes instructions configured to store a video recording from a video camera, the video including multiple time stamps within video meta-data.

11. The computer readable medium of claim 9 wherein the instructions configured to create the time stamped recording includes instructions configured to store a still image recording from a camera.

12. The computer readable medium of claim 9 further comprising instructions configured store the transformed data, the flightpath array, the video metadata array, and the image metadata array on an aggregation database.

13. The computer readable medium of claim 9 further comprising instructions configured to:
detect a user selected telemetry point; and
enlarge the time stamped recording synchronized with the user selected telemetry point.

14. The computer readable medium of claim 9 further comprising instructions configured to:
create an image ID index synchronizing the time stamped recording with the time stamped telemetry point;
create a video ID index synchronizing the time stamped recording with the time stamped telemetry point; or
create a combination thereof.

15. The computer readable medium of claim 9 wherein the instructions configured to display the time stamped telemetry point includes instructions configured to display the time stamped telemetry point overlaid onto a map.

16. The computer readable medium of claim 9 wherein the instructions configured to synchronize the time stamped telemetry point with the time stamped recording includes instructions configured to synchronize according to the following equation:

$$f\_Synch(x, y, z, t, f) = \int_0^t DroneLOG(t, x, y, z) \cap DroneFP(t, x, y, z) \cap GPS(t, x, y, z) \cap Rec(t, F, m)$$

where:
x, y, and z set forth three dimensional coordinates;
t sets forth a GPS time stamp offset;
F sets forth a timing frame for video;
m sets forth the meta data of the time stamped recording;
f_Synch sets forth a matrix map for the time stamped recording;
DroneLOG sets forth recordings from the unmanned arial vehicle including the three dimensional coordinates and the GPS time stamp offset;
DroneFP sets forth a flightpath of the unmanned aerial vehicle including the three dimensional coordinates and the GPS time stamp offset;
GPS sets forth recordings from the GPS unit including the three dimensional coordinates and the GPS time stamp offset; and
Rec sets forth the time stamped recording including the GPS time stamp offset, the timing frame, and the meta data.

17. A positional recording synchronization system comprising a processor configured to:
create a time stamped telemetry point for an unmanned aerial vehicle from a locational timer and a GPS unit;
create a time stamped recording from a recording sensor including an audiovisual sensor and a recording timer, the time stamped recording including metadata;
create transformed data from the time stamped recording, the transformed data being tiles for zooming or thumbnails, the transformed data organized into a table having a recording time stamp of the time stamped recording in a first column, and the transformed data in a second column;
create a flightpath array, an image metadata array, and a video metadata array, the transformed data being keyed, with a unique index IDs, to rows within the flightpath array;
retrieving the flightpath array, the image metadata array, and the video metadata array, each of which being in a final completed form, from an aggregation database;
determine whether entries of the video metadata array retrieved from the aggregation database match with the flightpath array retrieved from the aggregation database;
determine whether entries of the image metadata array retrieved from the aggregation database match with the flightpath array retrieved from the aggregation database;
synchronize the time stamped telemetry point with the time stamped recording based on the entries of the image metadata array matching the flightpath array, the entries of the visualizer module matching the flightpath array, or a combination thereof; and
display the time stamped telemetry point as a selection tool for calling, viewing, or manipulating the time stamped recording on a display.

18. The system of claim 17 further comprising storage configured to store a video recording from a video camera, the video including multiple time stamps within video meta-data, store a still image recording from a camera, or a combination thereof.

19. The system of claim 17 further comprising storage configured store the transformed data, the flightpath array, the video metadata array, and the image metadata array on an aggregation database.

20. The system of claim 17 wherein the processor is configured to:
detect a user selected telemetry point; and
enlarge the time stamped recording synchronized with the user selected telemetry point.

21. The system of claim 17 wherein the processor is configured to:
create an image ID index synchronizing the time stamped recording with the time stamped telemetry point;
create a video ID index synchronizing the time stamped recording with the time stamped telemetry point; or
create a combination thereof.

22. The system of claim 17 wherein the processor is configured to display the time stamped telemetry point overlaid onto a map.

23. The system of claim 17 wherein the processor is configured to synchronize the time stamped telemetry point with the time stamped recording according to the following equation:

$$f\_Synch(x, y, z, t, f) = \int_0^t DroneLOG(t, x, y, z) \cap$$
$$DroneFP(t, x, y, z) \cap GPS(t, x, y, z) \cap Rec(t, F, m)$$

where:
x, y, and z set forth three dimensional coordinates;
t sets forth a GPS time stamp offset;
F sets forth a timing frame for video;
m sets forth the meta data of the time stamped recording;
f_Synch sets forth a matrix map for the time stamped recording;
DroneLOG sets forth recordings from the unmanned arial vehicle including the three dimensional coordinates and the GPS time stamp offset;
DroneFP sets forth a flightpath of the unmanned aerial vehicle including the three dimensional coordinates and the GPS time stamp offset;
GPS sets forth recordings from the GPS unit including the three dimensional coordinates and the GPS time stamp offset; and
Rec sets forth the time stamped recording including the GPS time stamp offset, the timing frame, and the meta data.

* * * * *